United States Patent
Tyagi et al.

(10) Patent No.: US 9,664,118 B2
(45) Date of Patent: May 30, 2017

(54) METHOD AND SYSTEM FOR CONTROLLING COMPRESSOR FORWARD LEAKAGE

(71) Applicant: General Electric Company, Schenectady, NY (US)

(72) Inventors: Jagdish Prasad Tyagi, Meerut (IN); Srinivasarao Pakkala, Chintalapudi (IN)

(73) Assignee: General Electric Company, Schenectady, NY (US)

( * ) Notice: Subject to any disclaimer, the term of this patent is extended or adjusted under 35 U.S.C. 154(b) by 561 days.

(21) Appl. No.: 14/062,407

(22) Filed: Oct. 24, 2013

(65) Prior Publication Data
US 2015/0114000 A1    Apr. 30, 2015

(51) Int. Cl.
*F01D 11/00*    (2006.01)
*F04D 29/08*    (2006.01)
*F02C 9/18*    (2006.01)
*F04D 29/32*    (2006.01)

(52) U.S. Cl.
CPC ............. *F02C 9/18* (2013.01); *F04D 29/083* (2013.01); *F04D 29/322* (2013.01)

(58) Field of Classification Search
CPC ........ F01D 11/00; F01D 11/008; F01D 11/02; F01D 5/081; F01D 5/022; F01D 5/066; F02C 9/18; F04D 29/083; F04D 29/322; F04D 29/32
USPC ........................................................ 415/193
See application file for complete search history.

(56) References Cited

U.S. PATENT DOCUMENTS

| | | | |
|---|---|---|---|
| 4,702,670 A | 10/1987 | Winter | |
| 4,719,747 A * | 1/1988 | Willkop | .................. F01D 5/066 415/115 |
| 4,923,377 A | 5/1990 | Cavalleri | |
| 5,174,105 A | 12/1992 | Hines | |
| 6,164,902 A | 12/2000 | Irwin et al. | |
| 6,267,553 B1 * | 7/2001 | Burge | ....................... F01D 5/06 415/115 |
| 6,997,686 B2 | 2/2006 | Agrawal et al. | |
| 7,074,006 B1 * | 7/2006 | Hathaway | ............. F04D 29/164 415/1 |
| 7,568,882 B2 | 8/2009 | Brittingham et al. | |
| 7,597,539 B1 | 10/2009 | Liang | |
| 7,704,045 B1 | 4/2010 | Liang | |
| 8,186,933 B2 | 5/2012 | Doss et al. | |
| 8,206,119 B2 | 6/2012 | Liotta et al. | |
| 8,435,004 B1 | 5/2013 | Liang | |

(Continued)

FOREIGN PATENT DOCUMENTS

EP            2236747 A2    10/2010

*Primary Examiner* — Eric Keasel
*Assistant Examiner* — Joshua R Beebe
(74) *Attorney, Agent, or Firm* — Armstrong Teasdale LLP

(57) ABSTRACT

A system for controlling compressor forward leakage to the compressor flow path in a gas turbine is provided. The system includes a first compressor rotor wheel coupled to an upstream face of a compressor spacer wheel. A second compressor rotor wheel is coupled to a downstream face of the compressor spacer wheel. The compressor spacer wheel includes at least one intake recess defined in the downstream face, at least one discharge recess defined in the upstream face, and at least one axial passage coupling the at least one intake recess in fluid communication with the at least one discharge recess.

15 Claims, 6 Drawing Sheets

(56) References Cited

U.S. PATENT DOCUMENTS

| | | |
|---|---|---|
| 8,454,310 B1 | 6/2013 | Downs |
| 8,491,263 B1 | 7/2013 | Liang |
| 8,506,241 B1 | 8/2013 | Liang |
| 2006/0153673 A1* | 7/2006 | Guemmer ............... F01D 5/145 |
| | | 415/115 |
| 2009/0044543 A1* | 2/2009 | Clemen .................... F02C 6/08 |
| | | 60/785 |
| 2012/0201652 A1* | 8/2012 | Ferslew .................. F01D 5/022 |
| | | 415/115 |

* cited by examiner

METHOD AND SYSTEM FOR CONTROLLING COMPRESSOR FORWARD LEAKAGE

BACKGROUND

The present disclosure relates generally to turbomachinery, and, more specifically, to methods and systems for controlling outflow leakage in compressor stages within gas turbines.

In at least some known gas turbines, ambient air is channeled into a compressor section of the gas turbine via an air intake. The compressor section compresses the air prior to channeling the air via a main air flowpath to a combustor section for ignition with a fuel. In at least some known gas turbines, compressed air present within higher tier compressor stages (i.e., further downstream stages) can be prompted to leak out of the main air flowpath, via cavities present within an inner wheelspace of the compressor section. Such cavities are oriented radially inward of the main flowpath of the air being compressed. More particularly, compressed air within the higher compressor stages is prompted to move upstream, into cavities defined on upstream and downstream sides of adjacent rotor wheels that are located in upstream, lower tier compressor stages. Specifically, these cavities receiving the leakage air are located between adjacent rotor and spacer wheels. The air pressure within these cavities is increased, resulting in the leakage of air back out into the main air flowpath in the lower tier compressor stages, where the leakage air can disturb the flow of air around the airfoils in the lower tier compressor stages.

In at least some known gas turbines, forward leakage of air can create conditions in which the gas turbine may experience an increased susceptibility to stall. Elevated ambient air temperatures can further increase the susceptibility of a gas turbine to compressor stall. In order to address such leakage on hot days, the gas turbine may have to be operated at a speed that is lower than its rated speed, to prevent the occurrence of compressor stall.

BRIEF DESCRIPTION

In one aspect, a method for controlling forward leakage in a gas turbine compressor is provided. The method includes coupling a first compressor rotor wheel to an upstream face of a compressor spacer wheel. The method also includes coupling a second compressor rotor wheel to a downstream face of the compressor spacer wheel, wherein the compressor spacer wheel includes at least one intake recess defined in the downstream face, at least one discharge recess defined in the upstream face, and at least one axial passage coupling the at least one intake recess in fluid communication with the at least one discharge recess.

In another aspect, a system for controlling leakage in a gas turbine compressor is provided. The system includes a first compressor rotor wheel coupled to an upstream face of a compressor spacer wheel. The system also includes a second compressor rotor wheel coupled to a downstream face of the compressor spacer wheel. The compressor spacer wheel includes at least one intake recess defined in the downstream face, at least one discharge recess defined in the upstream face, and at least one axial passage coupling the at least one intake recess in fluid communication with the at least one discharge recess.

In still another aspect, a gas turbine system is provided. The gas turbine system includes a compressor section. The gas turbine system also includes a combustion system coupled in flow communication with the compressor section. The gas turbine system also includes a turbine section coupled in flow communication with the combustion system. The compressor section includes a first compressor rotor wheel coupled to an upstream face of a compressor spacer wheel. The compressor section also includes a second compressor rotor wheel coupled to a downstream face of the compressor spacer wheel. The compressor spacer wheel includes at least one intake recess defined in the downstream face, at least one discharge recess defined in the upstream face, and at least one axial passage coupling the at least one intake recess in fluid communication with the at least one discharge recess.

DETAILED DESCRIPTION

As used herein, the terms "axial" and "axially" refer to directions and orientations extending substantially parallel to a longitudinal axis of a gas turbine engine. Moreover, the terms "radial" and "radially" refer to directions and orientations extending substantially perpendicularly to the longitudinal axis of the gas turbine engine. In addition, as used herein, the terms "circumferential" and "circumferentially" refer to directions and orientations extending arcuately about the longitudinal axis of the gas turbine engine. It should also be appreciated that the term "fluid" as used herein includes any medium or material that flows, including, but not limited to, gas and air.

Figure 1:
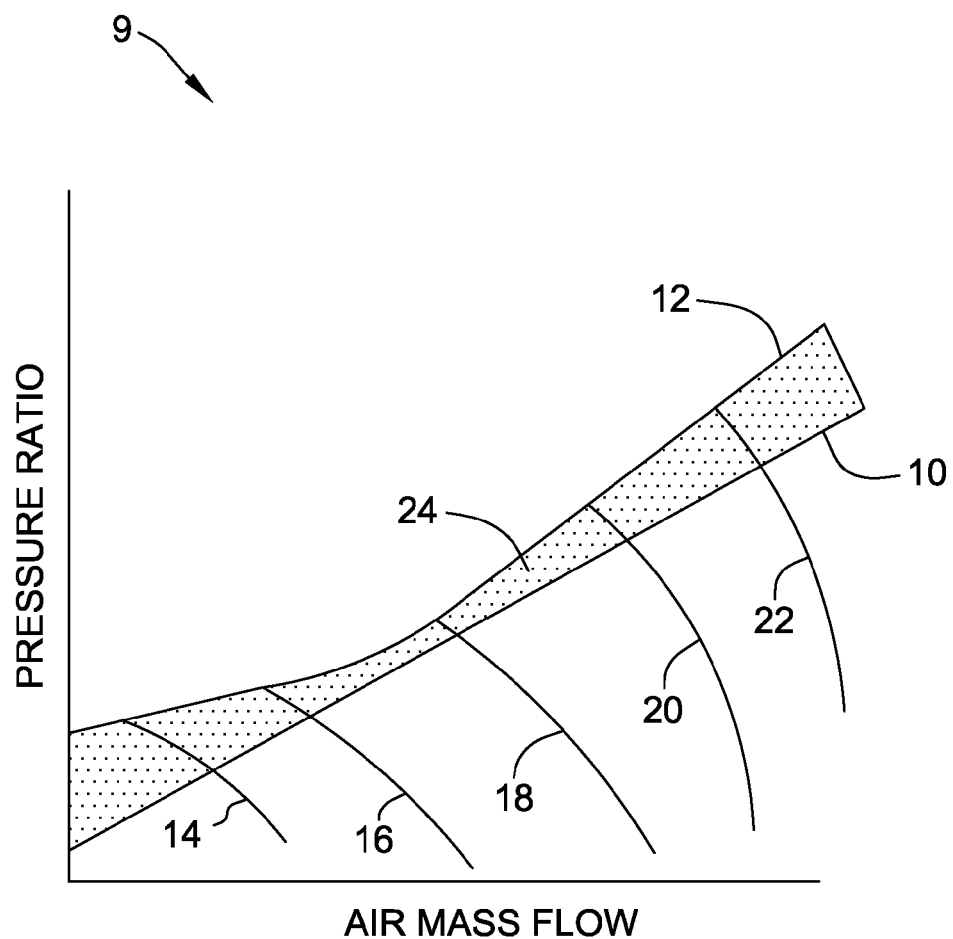
FIG. 1 is a graph illustrating a plot of gas turbine compressor pressure ratio as a function of air mass flow, and further illustrating compressor surge/stall margin.

In a gas turbine engine, amongst the parameters considered when evaluating the operation of a gas turbine compressor section are the compressor pressure ratio for each stage and the air mass flow rate through the compressor. FIG. 1 is a graph 9 illustrating an exemplary plot of compression ratio as a function of air mass flow for a hypothetical compressor. A straight line 10 on graph 9, often referred to as a compressor operating line, represents conditions corresponding to an optimal operation of the compressor. If, for a selected turbine speed and air mass flow rate, the compression (or pressure) ratio exceeds a predetermined value, compressor stall may occur. Graph 9 also includes constant speed lines 14, 16, 18, 20, and 22, wherein compressor speed is measured in revolutions per minute ("RPM"). A line 12 connects observed pressure ratio values relative to air mass flow rates, which pressure ratio values correspond to conditions under which compressor stall is likely to occur. Line 12 is sometimes referred to as a surge or stall line, and a surge or stall margin 24 is defined as a region between compressor operating line 10 and surge line 12.

In at least some known gas turbines, forward leakage of air from higher pressure compressor stages to lower pressure compressor stages can adversely affect operation of the compressor section by having the effect of increasing the pressure ratio at a particular air mass flow rate and turbine RPM. This in turn has the effect of reducing the stall margin. Certain ambient air conditions, such as, but not limited to, elevated air temperature can further reduce the stall margin ("hot day stall margin"). Specifically, turbulent or excessively hot air can alter the airflow passing through the successive rotor and stator vane stages, such that excessive pressures can develop between a rotor stage and an adjacent downstream stator vane stage. In at least some known gas turbines, the effects of such altered airflow conditions can become heightened in higher tier stages of the compressor section. In conditions in which the stall margin is reduced, in order to prevent occurrences of compressor stall, a gas turbine may have to be operated at less than its rated speed, resulting in an undesirable reduction in the output of the gas turbine.

Figure 2:
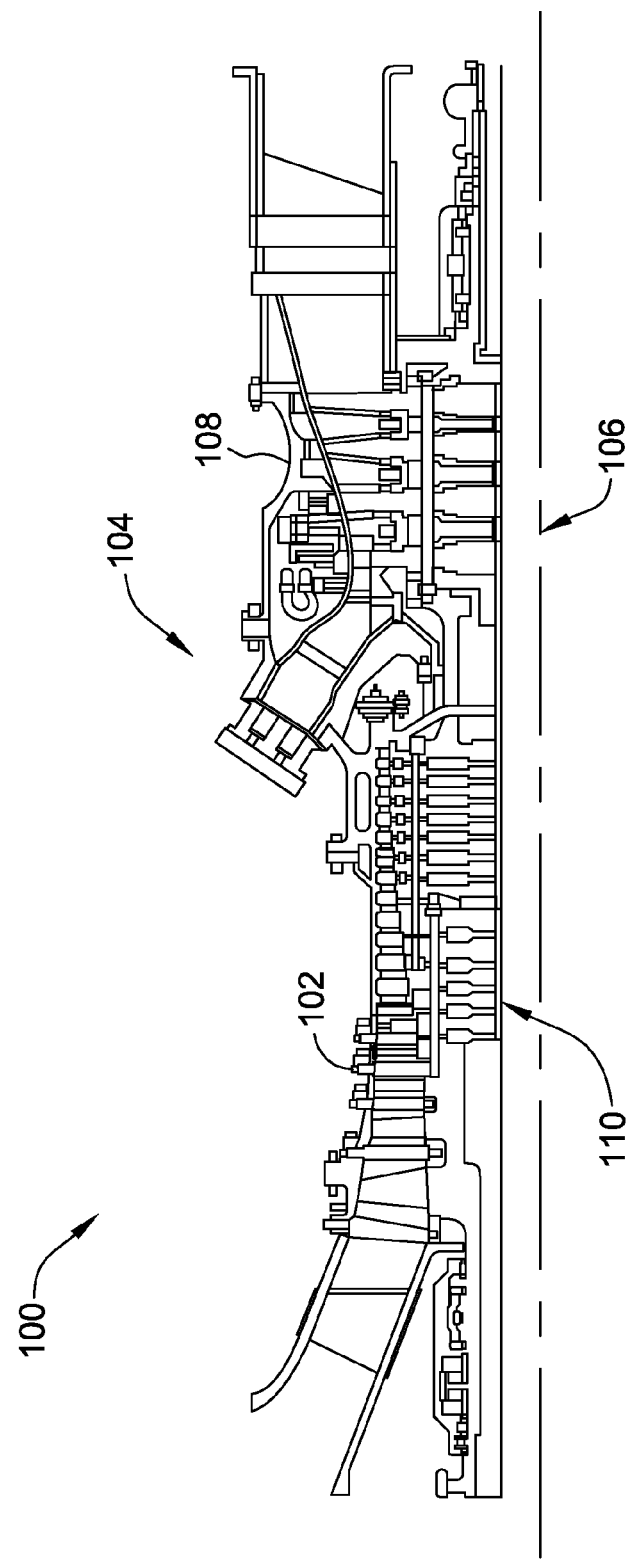
FIG. 2 is a schematic illustration of an exemplary gas turbine engine.

FIG. 2 is a schematic illustration of an exemplary gas turbine engine 100. Engine 100 includes a compressor rotor section 102 and a combustor assembly 104. Engine 100 also includes a turbine 108 and a common compressor/turbine shaft 110 (also sometimes referred to as a rotor 110).

Air channeled through compressor rotor section 102 is compressed and channeled to combustor assembly 104. Fuel is channeled to a combustion region and/or zone (not shown) that is defined within combustor assembly 104 wherein the fuel is mixed with the compressed air and ignited. Resulting combustion gases are channeled to turbine 108 wherein gas stream thermal energy is converted to mechanical rotational energy. Turbine 108 is rotatably coupled to compressor rotor 110, for rotation about an axis of rotation 106.

Figure 3:
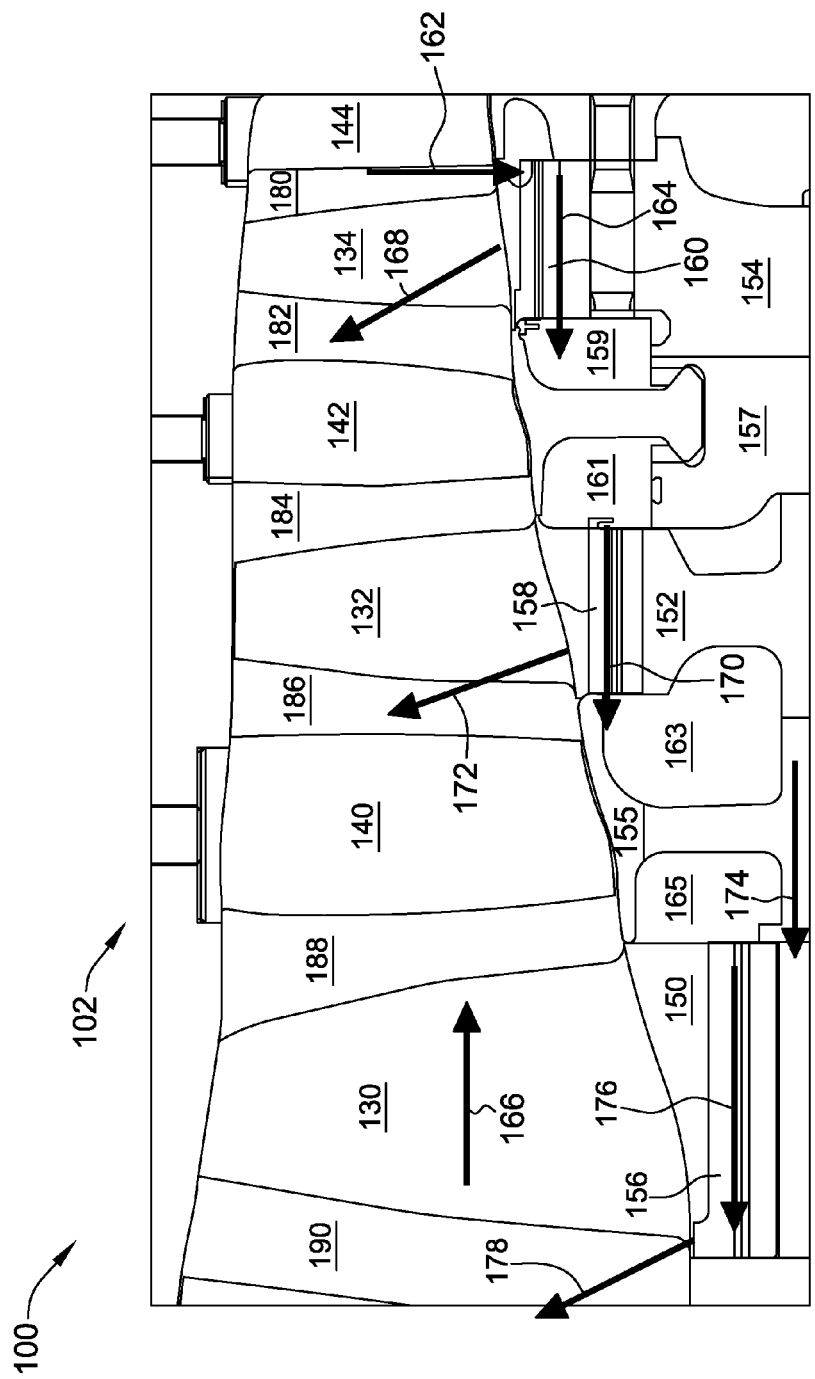
FIG. 3 is an enlarged view of the gas turbine engine shown in FIG. 2, illustrating exemplary leakage paths.

FIG. 3 is an enlarged view of gas turbine engine 100 (shown in FIG. 2), specifically compressor rotor section 102. A main compressor air flow 166 is channeled through compressor rotor section 102. Compressor rotor section 102 includes, for example, a first stage rotor blade 130 that is coupled to a rotor wheel 150 via a dovetail coupling 156, a second stage rotor blade 132 that is coupled to a rotor wheel 152 via a dovetail coupling 158, and a third stage rotor blade 134 that is coupled to a rotor wheel 154 via a dovetail coupling 160. In addition, rotor section 102 includes a first stage stator vane 140, a second stage stator vane 142, and a third stage stator vane 144. A spacer wheel 155 separates rotor wheels 150 and 152, and a spacer wheel 157 separates rotor wheels 152 and 154. A cavity 159 is defined between rotor wheel 154 and spacer wheel 157. Likewise, a cavity 161 is defined upstream of spacer wheel 157 between spacer wheel 157 and rotor wheel 152, a cavity 163 is defined upstream of rotor wheel 152 between rotor wheel 152 and spacer wheel 155, and a cavity 165 is defined upstream of spacer wheel 155, between spacer wheel 155 and rotor wheel 150.

As previously described, compressed air leakage flow 162 from a high pressure region 180 located downstream from third stage rotor blade 134 may be prompted to leak radially inwardly, and prompted to flow in a forward direction through compressor rotor section 102 as a leakage flow 164 channeled, for example, through dovetail coupling 160. Flows 162 and 164 cause air pressure within cavities 159 and 161 to be increased. A flow portion 168 may leak outwardly into a region 182 that is upstream from third stage rotor blade 134, where an air pressure in region 182 is lower than an air pressure in region 180. A further portion 170 of the leakage air may be channeled, for example, further forward past a region 184 upstream of second stage stator vane 142, and through dovetail coupling 158. Air pressure within cavities 163 and 165 are increased. Accordingly, a flow portion 172 of flow portion 170 may be further channeled into a region 186 that is upstream of second stage rotor blade 132, where an air pressure in region 186 is lower than the air pressure in region 182.

The increase in air pressure within cavities 159, 161, 163, and/or 165 contributes to leakage flow portions 168 and 172, which can adversely affect the flow of compressed air through compressor rotor section 102. The methods and systems described herein seek to address leakage flow portions 168 and 172 by preventing an increase in the air pressure within cavities 159, 161, 163, and/or 165. This may be accomplished by prompting leakage flow 162 to be channeled even further forward through compressor rotor section 102, past a region 188 downstream of first stage rotor blade 130, as flow portions 174 and 176, such that the leakage air flow is discharged as a flow 178 into a region 190 downstream from first stage rotor blade 130, where any impacts that may arise from the introduction of flow 178 into main compressor air flow 166 are reduced.

Figure 4:
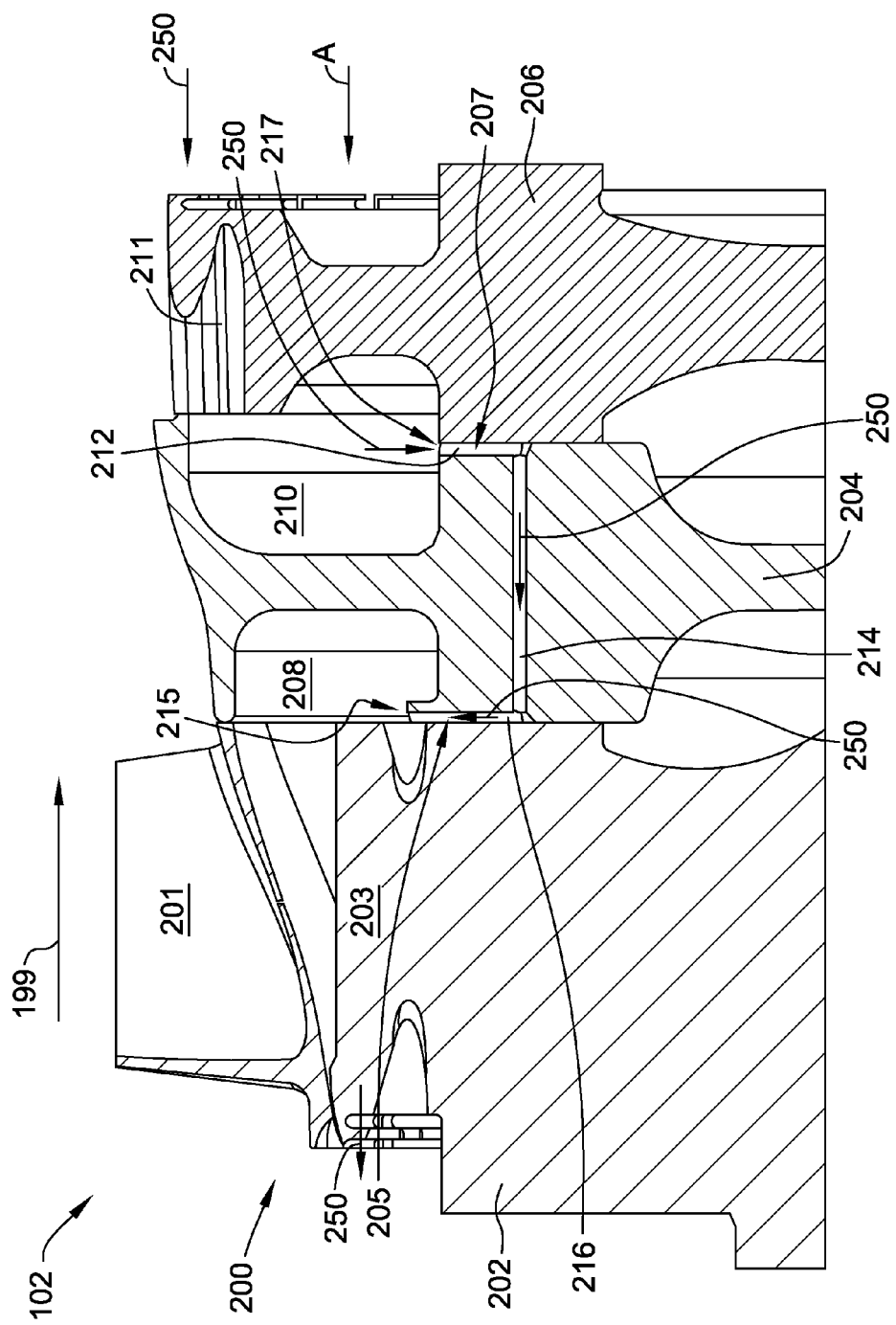
FIG. 4 is an enlarged view of a compressor section of the gas turbine engine shown in FIG. 2, illustrating an exemplary leakage control system.

FIG. 4 is an enlarged sectional view of compressor rotor section 102, illustrating an exemplary leakage control system 200. A main air flow 199 of air to be compressed is channeled through compressor rotor section 102 in the direction of the arrow ("downstream direction"). Compressor rotor section 102 includes at least a first, or upstream, rotor wheel 202 rotationally coupled to an adjacent spacer wheel 204. Rotor blades 201 are coupled at spaced intervals around rotor wheel 202 using any suitable coupling mechanism, including but not limited to dovetail couplings 203 between rotor blades 201 and rotor wheel 202. Spacer wheel 204 is rotationally coupled to a second, downstream, rotor wheel 206. In the exemplary embodiment, wheels 202 and 206 are coupled to spacer wheel 204 using any suitable coupling method (not shown), such as bolts, that enables system 200 to function as described herein. A plurality of rotor blades (not shown) is coupled at spaced intervals around rotor wheel 206, for example via rotor blade dovetail couplings 211. In the exemplary embodiment, rotor wheels 202 and 206 are located in lower stages of rotor section 102, and are analogous to rotor wheels 150 and 152, shown in FIG. 3.

In the exemplary embodiment, an upstream interface 205 extends between rotor wheel 202 and spacer wheel 204. In addition, a downstream interface 207 extends between spacer wheel 204 and rotor wheel 206. Furthermore, spacer wheel 204 defines an upstream cavity 208 and a downstream cavity 210. Leakage control system 200 includes an intake passage 212 defined in interface 207, an axial passage 214 that is connected in fluid communication with intake passage 212, and a discharge passage 216 defined in interface 205 that is connected in fluid communication with axial passage 214.

By providing intake passage 212, axial passage 214, and discharge passage 216, high pressure air within cavity 210 is prompted to move in an upstream direction through spacer wheel 204, and subsequently past rotor wheel 202, for example via dovetail coupling 203. In this manner, air pressure within cavities 210 and 208 is precluded from increasing and leaking outwardly back into main air flow 199. Moreover, by reducing air pressure in cavities 210 and 208, and providing an air flow path along passages 212, 214, 216, an increase in air pressure in rotor-spacer wheel cavities (not shown) located further downstream is precluded or reduced, which facilitates a reduction in leakage back into main air flow 199 at those downstream locations as well.

In the exemplary embodiment, rotor wheel 202 is oriented within compressor rotor section 102 as part of a first rotor stage, and rotor wheel 206 is oriented within compressor rotor section 102 as part of a second rotor stage. In alternative embodiments, rotor wheels 202 and 206 are coupled together to define a pair of adjacent rotor stages oriented at any desired location within a gas turbine compressor section.

Figure 5:
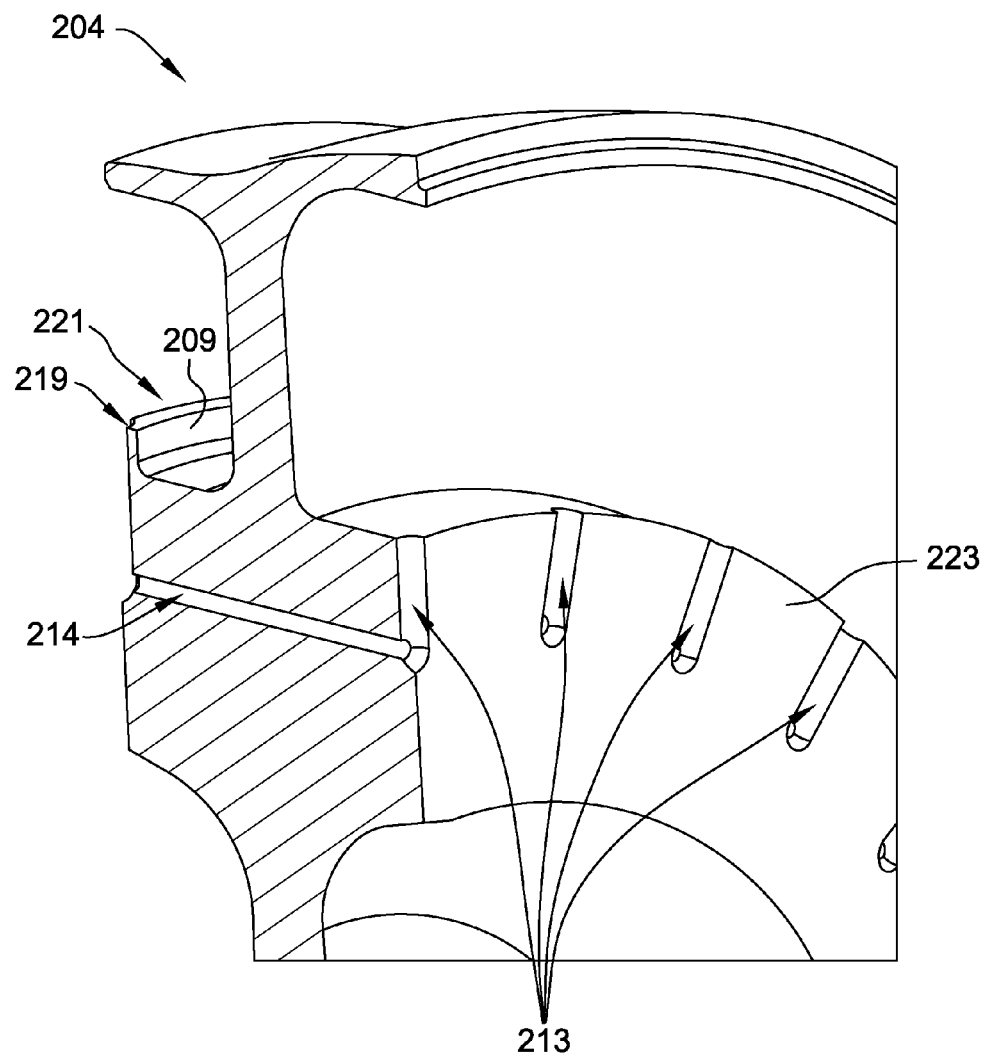
FIG. 5 is a perspective view of an exemplary spacer wheel for use in the gas turbine engine shown in FIG. 3.

FIG. 5 is an aft perspective sectional view of spacer wheel 204 used in gas turbine engine 100 (shown in FIG. 2). In the exemplary embodiment, spacer wheel 204 includes a forward circumferential flange 209. Each intake passage 212 (FIG. 4) is defined, in part, by an intake recess 213 oriented in an aft face 223 of spacer wheel 204. Each discharge passage 216 (FIG. 4) is defined, in part, by a discharge recess 219 defined in a forward face 221 of spacer wheel 204. Half of recess 219 is illustrated in FIG. 5. Axial passages 214 couple corresponding pairs of recesses 213 and 219 in fluid communication with each other. In the exemplary embodiment, recesses 213 and/or 219 extend substantially radially relative to axis 106 (shown in FIG. 2). In an alternative embodiment, recesses 213 and/or 219 are oriented in any manner that enables system 200 to function as described herein. Recesses 213 and 219 and axial passages 214 may be defined in spacer wheel 204 using any suitable formation method, including but not limited to, casting, drilling, and milling.

Figure 6:
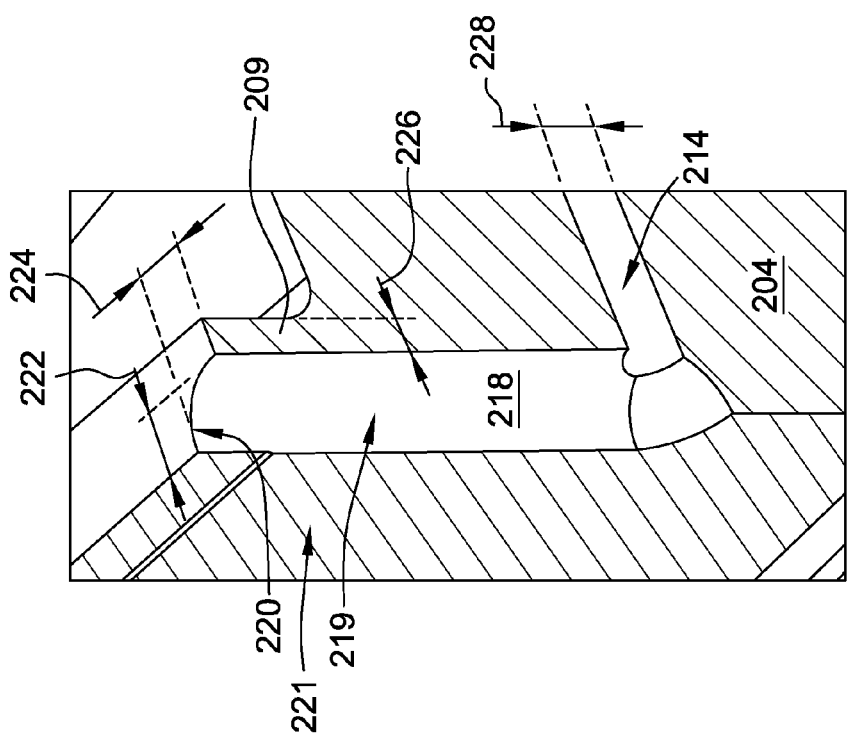
FIG. 6 is a perspective sectional view of the spacer wheel shown in FIG. 5.

FIG. 6 is a forward perspective sectional view of spacer wheel 204. In FIG. 6, half of discharge recess 219 is illustrated. Discharge recess 219 is defined at least in part by a curved wall 218. In the exemplary embodiment, discharge recess 219 is substantially semi-circular in cross-section, such that distances 222 and 224 are equal, being radii of discharge recess 219. An edge 220 defines in part discharge opening 215 (shown in FIG. 4). In the vicinity of discharge recess 219, flange 209 includes a residual thickness 226. Axial passage 214 includes a diameter 228. In the exemplary embodiment, a diameter (i.e., twice the size of radii 222 or 224) of discharge recess 219 is greater than a diameter 228 of axial passage 214. In an alternative embodiment, discharge recess 219, intake recess 213, and axial passage 214 may have any relative dimensions that enable system 200 to function as described herein.

Figure 7:
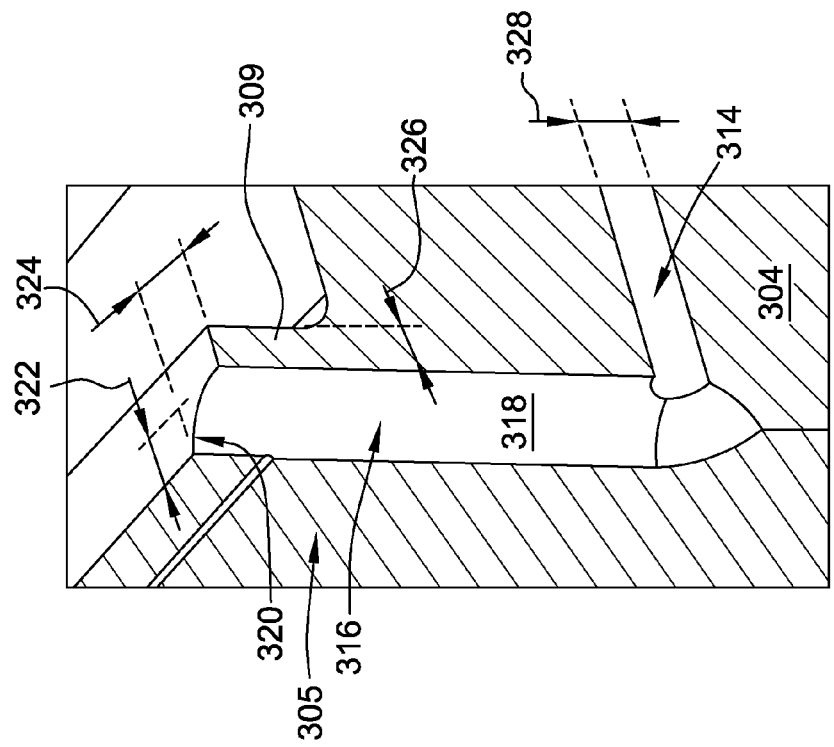
FIG. 7 is a perspective sectional view of an alternative exemplary spacer wheel.

FIG. 7 is a forward perspective sectional view of an alternative exemplary spacer wheel 304 that includes a circumferential flange 309. In spacer wheel 304, a recess 316 (half of which is illustrated in FIG. 7) is defined in a forward face 305 of spacer wheel 304, and includes a non-circular curved wall 318 and an opening edge 320. Recess 316 is provided with a cross-sectional configuration in the form of a half-oval or half-ellipse. Accordingly, in the exemplary embodiment recess 316 includes a depth or minor radius 322 and a half-width or major radius 324, wherein major radius 324 is substantially greater than minor radius 322. Accordingly, for a recess 316 that has a cross-sectional area that is substantially equal to a cross-sectional area of discharge recess 219 (shown in FIG. 5), a residual thickness 326 of flange 309 is greater than residual thickness 226 of flange 209 (shown in FIG. 5). By providing residual thickness 326 spacer wheel 304 is stronger in areas where recesses 316 are located in flange 309, than a comparably-dimensioned spacer wheel 204. In the exemplary embodiment, recess 316 has a total width (twice the size of major radius 324) that is greater than a diameter 328 of an axial passage 314. In the exemplary embodiment, axial passage 314 couples recess 316 in fluid communication with an aft recess (not shown) as described with respect to recesses 219 and 213 described hereinabove. Furthermore, recesses 316 and axial passages 314 may be created using any suitable method, including but not limited to, casting, drilling, and milling.

In the exemplary embodiment, recesses 213, 219, and 316, and axial passages 214 and 314 are described as having circular, elliptical, or other rounded cross-sectional configurations. In an alternative embodiment, the recesses and axial passages may have cross-sectional configurations in any geometrical shape that enables system 200 to function as described herein, such as, but not limited to a rounded configuration, a polygonal configuration, or a configuration that is a combination of rounded and straight-sided portions.

Referring back to FIG. 4, during operation of an exemplary gas turbine engine 100 (FIG. 1) incorporating system 200, as rotor 110 begins to rotate ambient air is drawn into compressor rotor section 102. Air flow 250 from higher-pressure compressor stages (not shown) is prompted to leak forward, i.e., in an upstream direction indicated by arrow A, and is channeled through rotor wheel 206, for example, along dovetail couplings 211, into cavity 210. Air flow 250 in cavity 210 is further channeled through intake opening 217 into intake passage 212. Air flow 250 is subsequently channeled into axial passage 214, through discharge passage 216, and into cavity 208. From cavity 208, air flow 250 is further channeled forward through leakage paths (not shown) including, but not limited to, paths along dovetail couplings 203. Air flow 250 is then discharged back into a cavity (not shown) upstream of rotor wheel 202. In the exemplary embodiment, leakage of air flow 250 back into main air flow 199 (shown in FIG. 4) at a position upstream of rotor wheel 202 should not adversely affect main air flow 199. As previously described, by channeling leakage air through passages 212, 214, and 216, air pressure within cavities 210 and 208, and in further downstream cavities, such as cavities 159, and 161 (shown in FIG. 3) is prevented from increasing and subsequently undesirably leaking back out into main air flow 199 (or air flow 166 as shown in FIG. 3). While leakage is described as occurring between the particular compressor components described herein and shown in the Figures, it is understood that in at least some compressor sections of gas turbine engines, forward leakage may occur between any pair or series of adjacent compressor section components. Accordingly, the methods and systems herein may be applied at any location within a compressor section of a gas turbine engine.

The above-described systems and methods overcome at least some disadvantages of known gas turbines. Specifically, the systems and methods described herein provide controlled paths for leakage air from higher-pressure compressor stages to lower-pressure stages where discharge of the leakage air back into the main air flow path is less likely to adversely affect compressor performance. By prompting leakage air further forward along the compressor section, undesired leakage of air into the main air flow path at locations where the leakage air can increase the compression ratio is avoided. As a result, the stall margin of the compressor section, particularly the hot day stall margin, is improved.

Exemplary embodiments of a method and a system for controlling compressor leakage are described above in detail. The method and system are not limited to the specific embodiments described herein, but rather, components of systems and/or steps of the methods may be utilized independently and separately from other components and/or steps described herein. For example, the method may also be used in combination with other turbine components, and are not limited to practice only with a gas turbine compressor section as described herein. Rather, the exemplary embodiment can be implemented and utilized in connection with many other rotary machine applications.

The method steps described herein are just examples. There may be many variations to the steps (or operations) described therein without departing from the spirit of the disclosure. For instance, except as specifically described, the steps may be performed in a differing order, or steps may be added, deleted or modified. All of these variations are considered a part of the claimed invention.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the methods and systems described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A method for controlling forward leakage flow in a gas turbine compressor, said method comprising:
    coupling a first compressor rotor wheel to an upstream face of a compressor spacer wheel, wherein a forward cavity is defined within the compressor spacer wheel, the first compressor rotor wheel including at least one leakage path coupled in flow communication with the forward cavity and an upstream low pressure region; and
    coupling a second compressor rotor wheel to a downstream face of the compressor spacer wheel, wherein an aft cavity is defined within the compressor spacer wheel, the compressor spacer wheel including a leakage control system including at least one intake recess defined in the downstream face, at least one discharge recess defined in the upstream face, and at least one axial passage coupling the at least one intake recess in fluid communication with the at least one discharge recess, such that the leakage control system channels the forward leakage flow from the aft cavity upstream to the forward cavity, wherein the forward leakage flow is further channeled to the upstream low pressure region via the at least one leakage path such that an air pressure of the forward leakage flow within the forward and aft cavities is precluded from increasing and leaking outwardly into a main air flow of the gas turbine compressor, and
    wherein the at least one intake recess extends outwardly from the at least one axial passage to the aft cavity relative to an axis of rotation of the compressor spacer wheel, and the at least one discharge recess extends outwardly from the at least one axial passage to the forward cavity relative to the axis of rotation of the compressor spacer wheel.

2. The method in accordance with claim 1, wherein said method comprises defining at least one of the at least one intake recess and the at least one discharge recess in a radial direction on the compressor spacer wheel.

3. The method in accordance with claim 1, wherein said method comprises defining at least one of the at least one intake recess and the at least one discharge recess to include one of a semi-circular cross-section, an oval cross-section, a polygonal cross-section, a cross-section including curved and straight portions.

4. The method in accordance with claim 1, wherein said method comprises defining at least one of the at least one intake recess and the at least one discharge recess to include a semi-oval cross-section, wherein the semi-oval cross-section includes a width that is greater than a depth of the cross-section.

5. The method in accordance with claim 1, wherein said method comprises defining the at least one axial passage to include a cross-sectional configuration that includes one of a circular cross-section, an oval cross-section, a polygonal cross-section, a cross-section including straight and curved portions.

6. A system for controlling forward leakage flow in a gas turbine compressor, said system comprising:
    a compressor spacer wheel comprising an upstream face, a downstream face, an aft cavity defined in said downstream face, a forward cavity defined in said upstream face, and a leakage control system comprising at least one intake recess defined in said downstream face, at least one discharge recess defined in said upstream face, and at least one axial passage coupling said at least one intake recess in fluid communication with said at least one discharge recess;
    a first compressor rotor wheel coupled to said upstream face of said compressor spacer wheel, said first compressor rotor wheel comprising at least one leakage path coupled in flow communication with said forward cavity and an upstream low pressure region of said a gas turbine compressor; and
    a second compressor rotor wheel coupled to said downstream face of said compressor spacer wheel,
    wherein said at least one intake recess extends outwardly from said at least one axial passage to said aft cavity relative to an axis of rotation of said compressor spacer wheel, and said at least one discharge recess extends outwardly from said at least one axial passage to said forward cavity relative to the axis of rotation of said compressor spacer wheel, such that said leakage control system channels the forward leakage flow from said aft cavity upstream to said forward cavity, wherein the forward leakage flow is further channeled to the upstream low pressure region via said at least one leakage path such that an air pressure of the forward leakage flow within said forward and aft cavities is precluded from increasing and leaking outwardly into a main air flow of said gas turbine compressor.

7. The system in accordance with claim 6, wherein at least one of said at least one intake recess and said at least one discharge recess is oriented in a radial direction on said compressor spacer wheel.

8. The system in accordance with claim 6, wherein at least one of said at least one intake recess and said at least one discharge recess includes a cross-sectional configuration that is one of semi-circular, semi-oval, polygonal, a combination of curved and straight portions.

9. The system in accordance with claim 6, wherein at least one of said at least one intake recess and said at least one discharge recess includes a semi-oval cross-section, wherein said semi-oval cross-section includes a width that is greater than a depth of said cross-section.

10. The system in accordance with claim 6, wherein said at least one axial passage includes a cross-sectional configuration that is one of circular, oval, polygonal, a combination of straight and curved portions.

11. A gas turbine system, said gas turbine system comprising:
  a compressor section;
  a combustion system coupled in flow communication with said compressor section; and
  a turbine section coupled in flow communication with said combustion system, said compressor section comprising:
    a compressor spacer wheel comprising an upstream face, a downstream face, an aft cavity defined in said downstream face, a forward cavity defined in said upstream face, and a leakage control system comprising at least one intake recess defined in said downstream face, at least one discharge recess defined in said upstream face, and at least one axial passage coupling said at least one intake recess in fluid communication with said at least one discharge recess;
    a first compressor rotor wheel coupled to said upstream face of said compressor spacer wheel, said first compressor rotor wheel comprising at least one leakage path coupled in flow communication with said forward cavity and an upstream low pressure region of said compressor section; and
    a second compressor rotor wheel coupled to said downstream face of said compressor spacer wheel,
  wherein said at least one intake recess extends outwardly from said at least one axial passage to said aft cavity relative to an axis of rotation of the compressor spacer wheel, and said at least one discharge recess extends outwardly from said at least one axial passage to said forward cavity relative to the axis of rotation of said compressor spacer wheel, such that said leakage control system channels a forward leakage flow from said aft cavity upstream to said forward cavity, wherein the forward leakage flow is further channeled to the upstream low pressure region via said at least one leakage path such that an air pressure of the forward leakage flow within said forward and aft cavities is precluded from increasing and leaking outwardly into a main air flow of said compressor section.

12. The gas turbine system in accordance with claim 11, wherein at least one of said at least one intake recess and said at least one discharge recess is oriented in a radial direction on said compressor spacer wheel.

13. The gas turbine system in accordance with claim 11, wherein at least one of said at least one intake recess and said at least one discharge recess includes a cross-sectional configuration that is one of semi-circular, semi-oval, polygonal, a combination of curved and straight portions.

14. The gas turbine system in accordance with claim 11, wherein at least one of said at least one intake recess and said at least one discharge recess includes a semi-oval cross-section, wherein said semi-oval cross-section includes a width that is greater than a depth of said cross-section.

15. The gas turbine system in accordance with claim 11, wherein said at least one axial passage includes a cross-sectional configuration that is one of circular, oval, polygonal, a combination of straight and curved portions.

\* \* \* \* \*